United States Patent
Olszewski et al.

(10) Patent No.: US 10,740,234 B2
(45) Date of Patent: Aug. 11, 2020

(54) VIRTUAL PROCESSOR CACHE REUSE

(71) Applicant: International Business Machines Corporation, Armonk, NY (US)

(72) Inventors: Bret R. Olszewski, Austin, TX (US); Ram Raghavan, Round Rock, TX (US); Maria Lorena Pesantez, Austin, TX (US); Gayathri Mohan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 16/121,021

(22) Filed: Sep. 4, 2018

(65) Prior Publication Data

US 2020/0073803 A1    Mar. 5, 2020

(51) Int. Cl.
*G06F 9/455* (2018.01)
*G06F 12/0806* (2016.01)

(52) U.S. Cl.
CPC ...... *G06F 12/0806* (2013.01); *G06F 9/45558* (2013.01); *G06F 2009/45583* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 8,219,995 B2 | 7/2012 | Flemming et al. | |
| 9,535,846 B2 | 1/2017 | Jacobs et al. | |
| 10,255,190 B2 * | 4/2019 | Loh | G06F 12/0895 |
| 2005/0132363 A1 | 6/2005 | Tewari et al. | |
| 2008/0209173 A1 * | 8/2008 | Evers | G06F 9/3804 |
| | | | 712/207 |

OTHER PUBLICATIONS

Sinharoy et al., "Advanced features in IBM POWER8 systems," IBM Journal of Research and Development, vol. 59, No. 1, Paper 1, Jan./Feb. 2015, 18 pages.
Mericas et al., "IBM POWER8 performance features and evaluation," IBM Journal of Research and Development, vol. 59, No. 1, Paper 6, Jan./Feb. 2015, 10 pages.
Zhuravlev et al., "Survey of Scheduling Techniques for Addressing Shared Resources in Multicore Processors," ACM Computing Surveys, vol. 45, No. 1, Article 4, Nov. 2012, 28 pages.
Traeger, "Analyzing Root Causes of Latency Distributions," Stony Brook University, Aug. 2008, 85 pages.
Soares, "Operating System Techniques for Reducing Processor State Pollution," Graduate Department of Electrical and Computer Engineering, University of Toronto, 2012, 166 pages.

* cited by examiner

*Primary Examiner* — Charlie Sun
(74) *Attorney, Agent, or Firm* — Van Leeuwen & VanLeeuwen; Bryan S. Bortnick

(57) ABSTRACT

An approach is provided in which a first core broadcasts a cache line request in response to detecting a cache miss corresponding to a first virtual central processing unit (VCPU) executing on the first core. Next, the first core receives a cache line response from the second core responding to the cache line request that includes tag extension data. The first core determines a cache miss type of the cache miss based on the tag extension data and, in turn, sends the cache miss type to a hypervisor that utilizes the cache miss type during a future VCPU dispatch selection.

20 Claims, 9 Drawing Sheets

| VCPU ID Comparison | Dispatch # Comparison | Lateral Castout Flag | Cache Miss Type |
|---|---|---|---|
| Match | No Match | False | VCPU Reuse |
| No Match | N/A | False | VCPU Sharing |
| Match | Match | False | Uncategorized Paradox |
| N/A | N/A | True | Lateral Castout |

FIG. 6

VIRTUAL PROCESSOR CACHE REUSE

BACKGROUND

Some processors today contain a "micropartition" prefetch feature to accelerate virtualization. Prefetching is speculative loading of memory into cache before it is actually accessed. The micropartition prefetch feature saves a most recent cache address contents from a virtual central processing unit (VCPU) dispatch and triggers prefetch of the contents on the next dispatch of the VCPU. A virtual CPU, also known as a virtual processor, is a physical central processing unit CPU that is assigned to a virtual machine (VM).

The micropartition prefetch feature assumes that the cache contents of a VCPU are displaced by other VCPUs being dispatched over time. Micropartition prefetch performance analysis indicates that L3 cache misses are frequently resolved from other caches. Additionally, chip or "device" misses are misses resolved from other L2 or L3 caches on the same device. While some of the misses are natural data sharing from multi-VCPU workloads (VCPU sharing), others are likely a result of a VCPU being undispatched on one core on the device and then being redispatched on another core on the device in a reasonably short time.

A challenge found is that today's systems do not capture various cache miss details pertaining to VCPUs and, therefore, the device's hypervisor is unable to dynamically adjust its guidelines for future VCPU dispatch decisions, such as selecting which VCPU to dispatch an on which core to dispatch the VCPU.

BRIEF SUMMARY

According to one embodiment of the present disclosure, an approach is provided in which a first core broadcasts a cache line request in response to detecting a cache miss corresponding to a first virtual central processing unit (VCPU) executing on the first core. Next, the first core receives a cache line response from the second core responding to the cache line request that includes tag extension data. The first core determines a cache miss type of the cache miss based on the tag extension data and, in turn, sends the cache miss type to a hypervisor that utilizes the cache miss type during a future VCPU dispatch selection.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 is an exemplary diagram depicting an initiating core's various criteria to assign a cache miss type to a cache miss;

DETAILED DESCRIPTION

Figure 1:
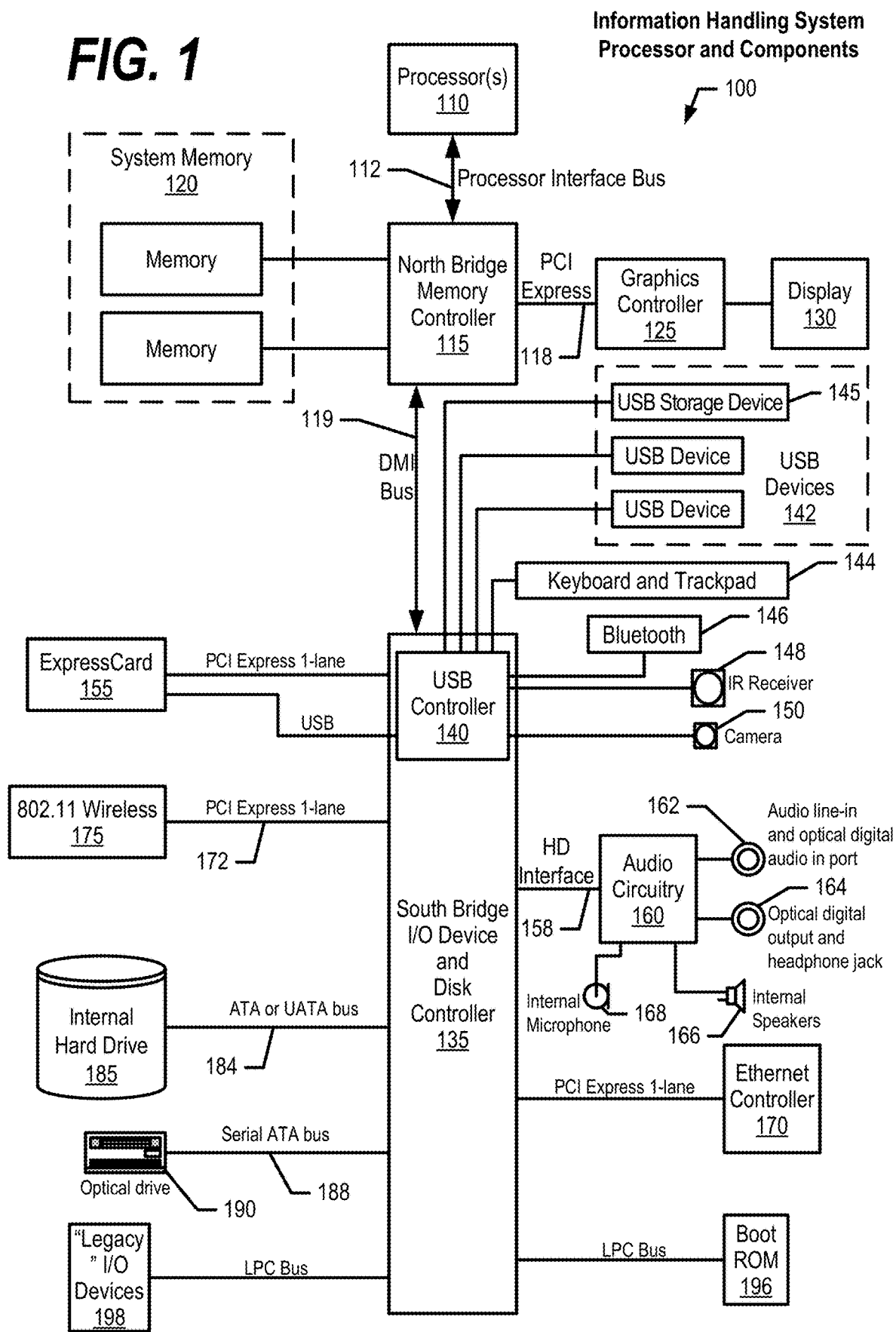
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
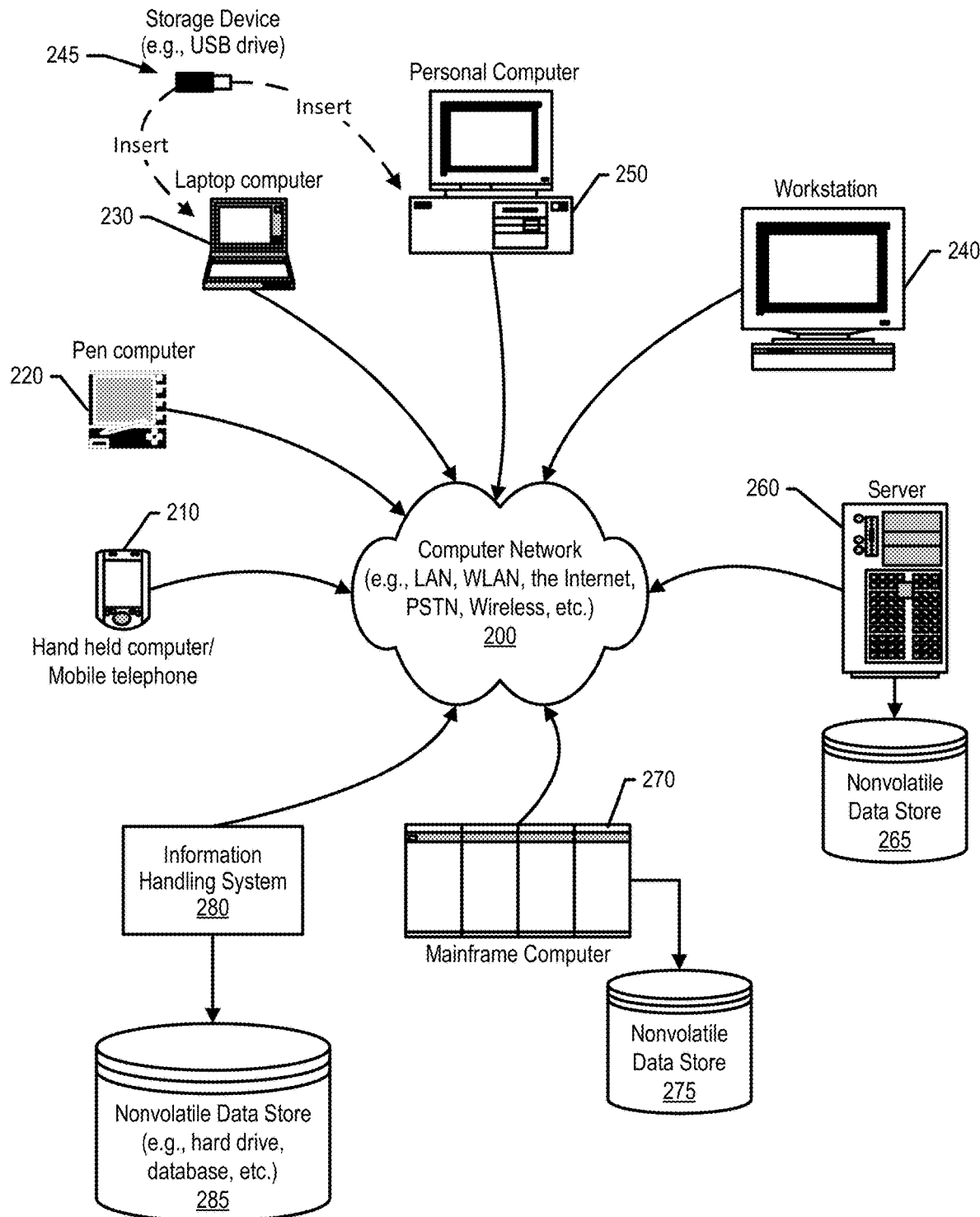
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 9 depict an approach of capturing VCPU cache misses executing on a first core that are resolved by other second cores within a multi-core device. The first core receives a cache line response from one of the second cores and extracts tag extension information from the cache line response. The cache line response, in one embodiment, includes a VCPU ID assigned to the cache line on the second core, a dispatch number, and a lateral castout flag. The first core compares the tag extension information to its VCPU that encountered the cache miss to determine whether the cache miss was from, for example, VCPU reuse, VCPU sharing, lateral castout, or an uncategorized paradox. Then, the first core sends the cache miss type and the VCPU ID that encountered the cache miss to a hypervisor. In turn, the hypervisor uses the received information as a basis for future dispatching decisions. As discussed herein, a chip, or device, includes multiple cores.

Figure 3:
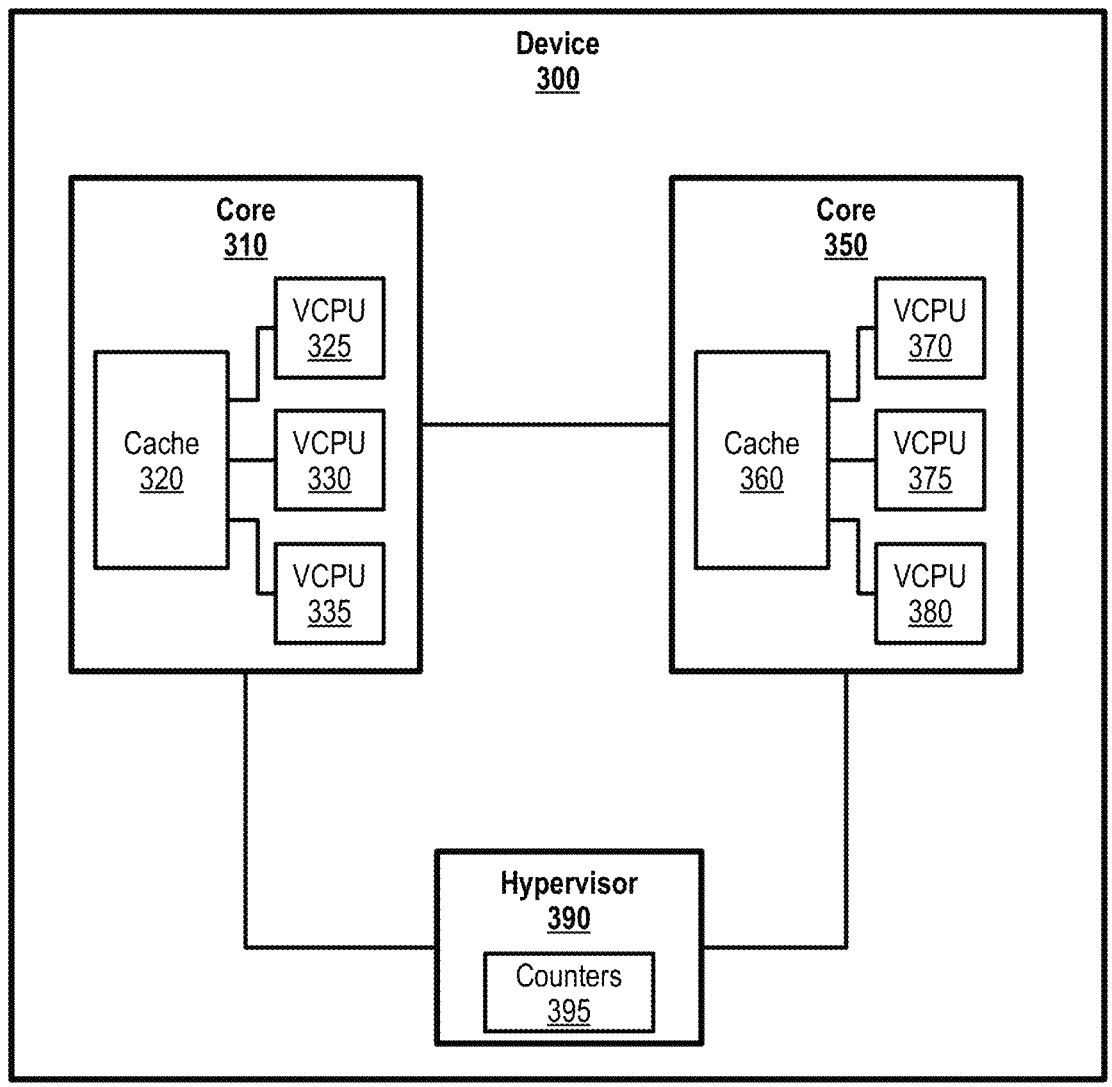
FIG. 3 is an exemplary diagram depicting a device that includes multiple cores and a hypervisor that dispatches virtual central processing units (VCPUs) to the various multiple cores.

FIG. 3 is an exemplary diagram depicting a device that includes multiple cores and a hypervisor that dispatches virtual central processing units (VCPUs) to the various multiple cores. Device 300, such as a multi-core processor, includes cores 310 and 350 along with hypervisor 390. As those skilled in the art can appreciate, device 300 may have more cores and execute more VCPUs than what is shown in FIG. 3.

Hypervisor 390 dispatches various VCPU's to cores 310 and 350 to execute software processes. VCPUs 325, 330, and 335 are executing on core 310 and use cache 320 to store and retrieve cache line data. VCPUs 370, 375, and 380 execute on core 350 and use cache 360 to store and retrieve cache line data. As discussed above, issues arise when cache line data is not locally available to a VCPU, such as when a VCPU is dispatched onto one core that requires cache line data that resides on a different core's cache.

To be able to monitor VCPU-oriented data access, the approach discussed herein adds additional tag information on cache line response that indicate which VCPU the cache line is currently assigned to on a different core. (see FIG. 4 and corresponding text for further details). The tag information includes additional bits to represent the VCPU identifier (ID) number and VCPU dispatch number (e.g., dispatch number) for the lines in the cache.

The dispatch number is incremented sequentially for each dispatch of the VCPU. In one embodiment, hidden registers are added to track the dispatch value, with the hypervisor in charge of managing the value (see FIG. 7 and corresponding text for further details). Additionally, when device 300 supports lateral castout, the tag information includes an additional bit to track the lateral castout condition on a per cache line basis. Lateral castout is a castout from one core's local cache (e.g. L3) to another core on the same device's local cache (e.g. L3).

In one embodiment, a cache sharing state may further be used to bias cache replacement policies. For example, shared data, which is often moved between caches, is likely frequently accessed. Thus, a cache replacement policy may attempt to retain this information with higher priority than normally accessed data. In this embodiment, the output from such monitoring could be used by the hypervisor or even operating system to make policy-based scheduling decisions.

Figure 4:
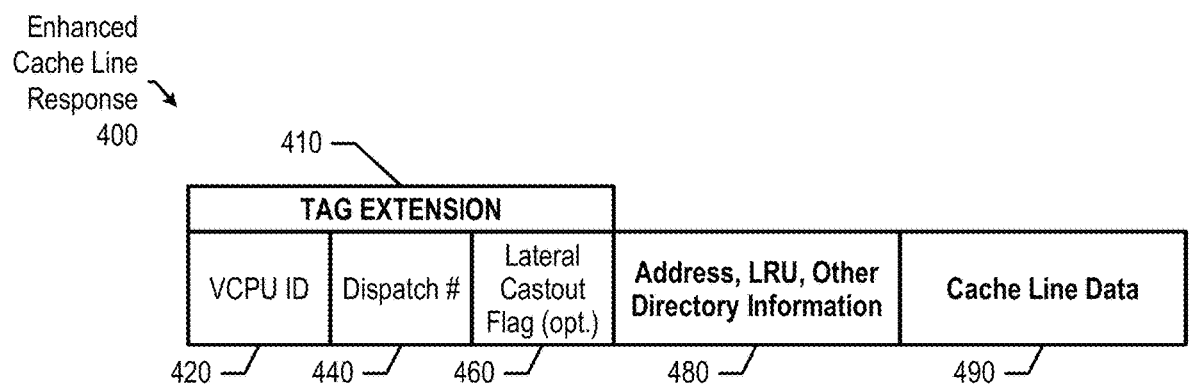
FIG. 4 is an exemplary diagram depicting a cache line response that includes tag extension information as discussed herein.

FIG. 4 is an exemplary diagram depicting a cache line response that includes tag extension information as discussed herein. When a responding core determines that its cache includes the cache line corresponding to a broadcasted cache miss, the responding core and adds tag extension 410 to the cache line (address/directory information 480 and cache line data 490), which results in enhanced cache line response 400. Tag extension 410 includes the VCPU ID of the VCPU currently assigned to cache line data 490, a dispatch number corresponding to cache line data 490, and a lateral castout flag if the device supports lateral castout. In turn, the responding core sends enhanced cache line response 400 to the initiating core over a coherency bus for further processing (see FIGS. 5, 8, and corresponding text for further details).

Figure 5:
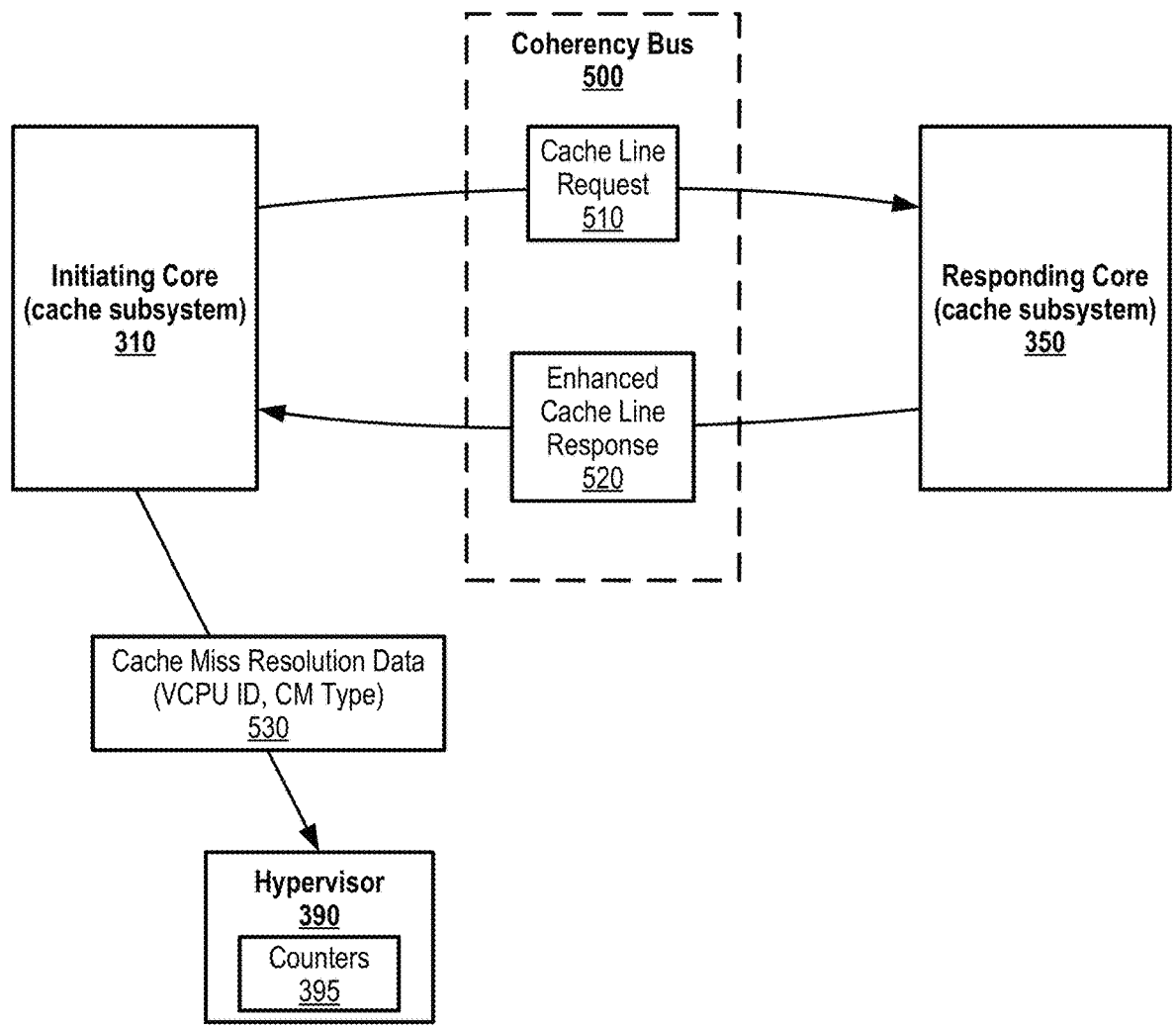
FIG. 5 is an exemplary diagram of a responding core fulfilling a cache line request of an initiating core and the initiating core sending cache miss resolution data to a hypervisor.

FIG. 5 is an exemplary diagram of a responding core fulfilling a cache line request of an initiating core and the initiating core sending cache miss resolution data to a hypervisor. Initiating core 310 (e.g. initiating core 310's cache subsystem) determines that one if its VCPUs experienced a cache miss and, in turn, broadcasts cache line request 510 onto coherency buss 500, which is part of device 300.

Responding core 350 (e.g., core 350's cache subsystem) determines that its local cache includes the missing cache line. In turn, responding core 350 adds tag extension information to the cache line as discussed herein, and sends enhanced cache line response 520 to initiating core 310.

Figure 8:
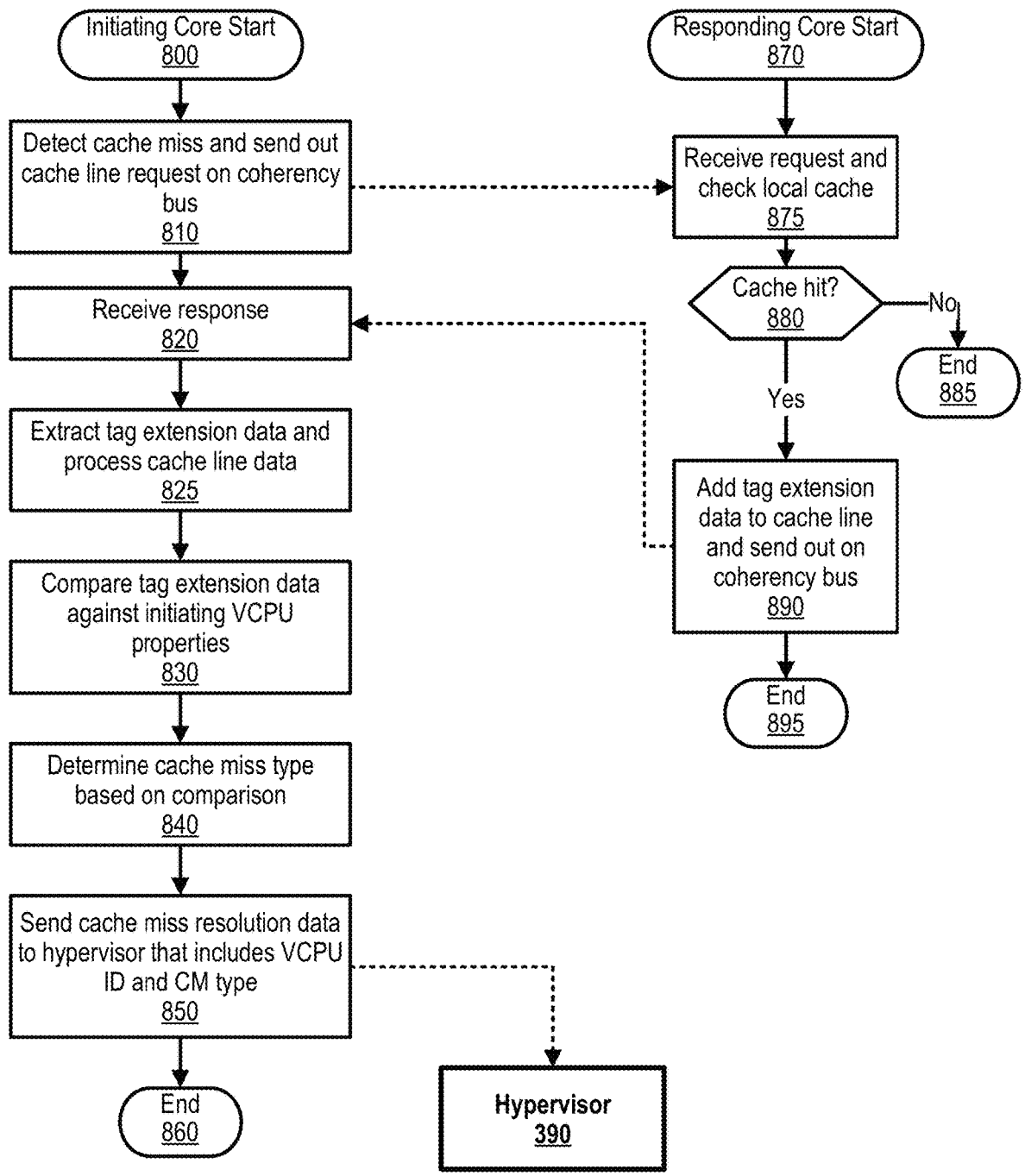
FIG. 8 is an exemplary flowchart showing steps taken by an initiating core receiving cache line data from a responding core and sending cache miss resolution data to a hypervisor.

Initiating core 310 analyzes the tag information and assigns a "cache miss type" to the cache miss based on the tag information and the initiating core 310's VCPU that experienced the cache miss (see FIGS. 6, 8, and corresponding text for further details). In turn, initiating core 310 sends cache miss resolution data 530, which includes the cache miss type and the VCPU ID that experienced the cache miss, to hypervisor 390. Hypervisor increments counters 395 accordingly and uses the incremented counter information for subsequent VCPU dispatch decisions (see FIG. 9 and corresponding text for further details).

FIG. 6 is an exemplary diagram depicting an initiating core's various criteria to assign a cache miss type to a cache miss. Table 600 includes columns 610 and 620, which correspond to the initiating core comparing VCPU IDs/dispatch numbers between the VCPU identified in the received tag extension (e.g., VCPU currently assigned to the cache line) with the VCPU that experienced the cache miss. Column 630 corresponds to a lateral castout bit that is stored in the received tag extension (FIG. 4, field 460). And column 640 includes cache miss types assigned to cache misses based on the criteria in columns 610, 620, and 630.

Row 650 corresponds to a situation when a VCPU was previously dispatched to a different core than it is currently executing. In this situation, the VCPU IDs match, the VCPU dispatch numbers do not match (because the VCPU is now further in the execution cycle than it was when previously dispatched), and the lateral castout bit is false. When these conditions are met, the initiating core assigns a VCPU reuse cache miss type to the cache miss because the same VCPU is reusing the cache line but just on a different core.

Row 660 corresponds to a situation when the cache line data is shared between VCPUs that are executing on different cores. In this situation, the VCPU IDs do not match and the VCPU dispatch number is irrelevant because they are different VCPUs, and the lateral castout flag is false. When these conditions are met, the initiating core assigns a VCPU sharing cache miss type to the cache miss because different VCPUs on different cores are sharing the same cache line.

Row 670 corresponds to a situation that should not occur which is one where both the VCPU IDs and dispatch numbers match while the lateral castout flag is false. When these conditions are met, the initiating core assigns an uncategorized paradox cache miss type to the cache miss.

Row 670 corresponds to a situation when lateral castout flag is true. In this situation, the VCPU IDs and the VCPU dispatch numbers are irrelevant and the initiating core assigns a lateral cast out cache miss type to the cache miss.

Figure 7:
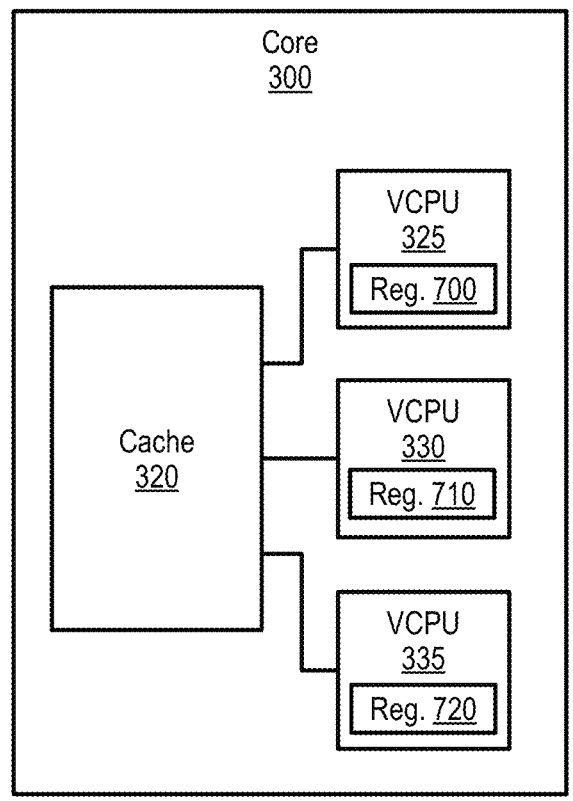
FIG. 7 is an exemplary diagram depicting an embodiment when hidden registers are assigned to each VCPU to track dispatch numbers.

FIG. 7 is an exemplary diagram depicting an embodiment when hidden registers are assigned to each VCPU to track dispatch numbers. In this embodiment, hypervisor 390 manages the values that are stored in the hidden registers.

Register 700 is assigned to VCPU 325 and stores VCPU 325's current dispatch number. Register 710 is assigned to VCPU 330 and stores VCPU 330's current dispatch number. And, register 720 is assigned to VCPU 335 and stores VCPU 335's current dispatch number. In this embodiment, a core is able to access the hidden registers to quickly determine their corresponding dispatch number, which us then utilized to determine cache miss types as discussed herein.

FIG. 8 is an exemplary flowchart showing steps taken by an initiating core receiving cache line data from a responding core and sending cache miss resolution data to a hypervisor. Initiating core processing commences at 800 whereupon, at step 810, the process detects a cache miss and sends out a cache line request on coherency bus 500. Responding core processing commences at 870 whereupon, at step 875, the process receives the request and checks its local cache.

The responding core process determines as to whether it includes the requesting cache line data (cache hit) (decision 880). If the responding core does not detect a cache hit, then decision 880 branches to the 'no' branch and FIG. 8 processing thereafter ends at 885. On the other hand, if there is a cache hit, decision 880 branches to the 'yes' branch. At step 890, the responding core process adds tag extension information to the cache line information (enhanced cache line response) and sends the enhanced cache line response out on coherency bus 500. FIG. 8 processing thereafter ends at 895.

Referring back to the initiating core process, the initiating process receives the response at step 820 and, at step 825, the initiating core process extracts the tag extension information and processes the cache line data. At step 830, the initiating core process compares the tag extension information against the properties of its VCPU that experienced the cache miss. At step 840, the process determines the cache miss type of the cache miss based on the comparison (see FIG. 6 and corresponding text for further details).

Figure 9:
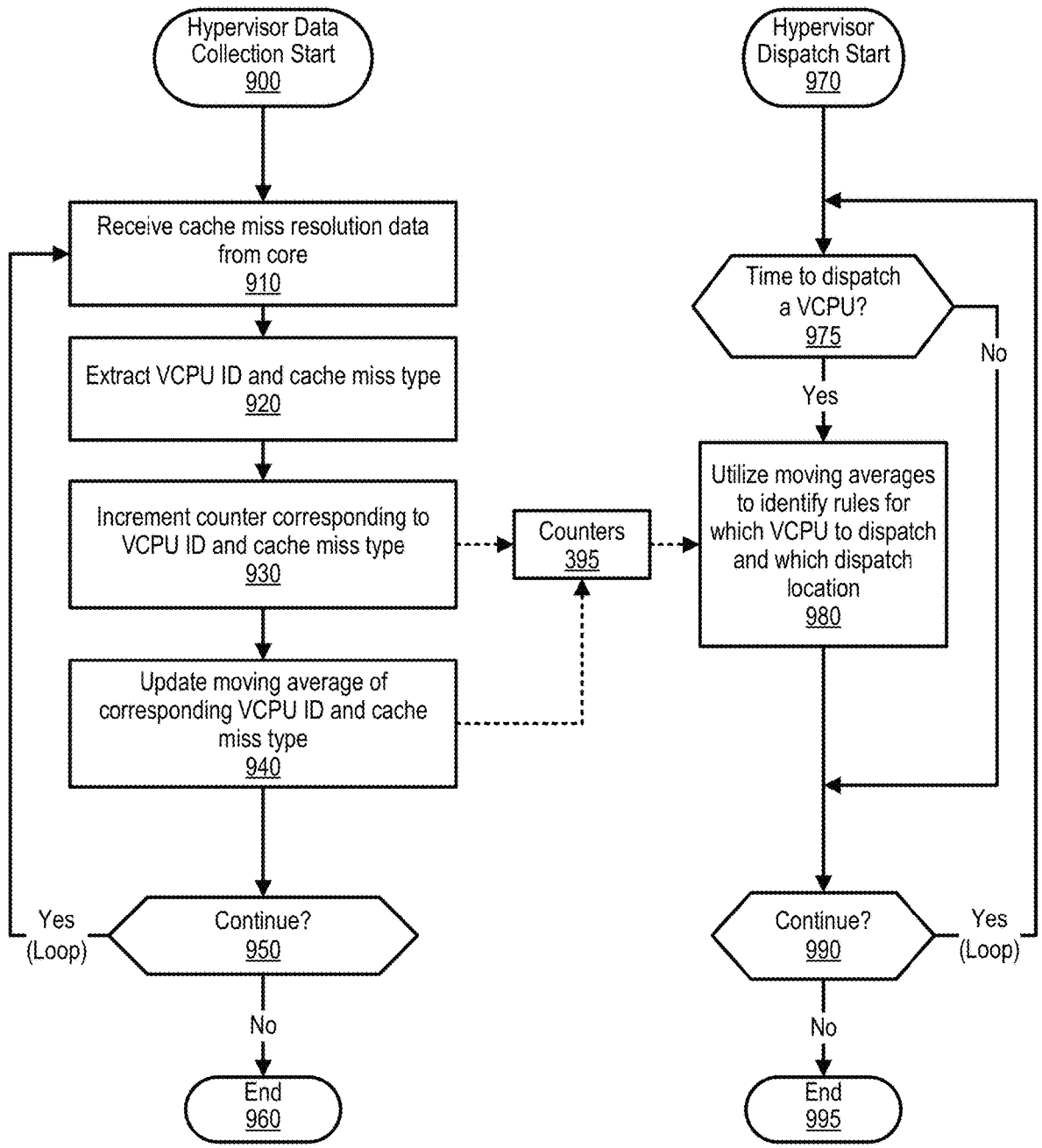
FIG. 9 is an exemplary flowchart showing steps taken by a hypervisor to capture cache miss resolution data and use the cache miss resolution data to dynamically influence future VCPU dispatch decisions.

At step 850, the initiating core process generates cache miss resolution data, which includes the cache miss type with a VCPU identifier of the VCPU that experienced the cache miss, and sends the cache miss resolution data to hypervisor for further analysis (see FIG. 9 and corresponding text for further details). Initiating core processing thereafter ends at 860.

FIG. 9 is an exemplary flowchart showing steps taken by a hypervisor to capture cache miss resolution data and use the cache miss resolution data to dynamically influence future VCPU dispatch decisions. FIG. 9 processing commences at 900 whereupon, at step 910, the process receives cache miss resolution data from a core whose VCPU encountered a cache miss.

At step 920, the process extracts a VCPU ID and cache miss type from the cache miss resolution data. At step 930, the process increments a counter in counters 395 corresponding to the VCPU ID and cache miss type. For example, counters 395 may have a counter for every combination of VCPU ID and cache miss type. At step 940, the process updates the moving average of the corresponding VCPU ID and cache miss category based on the counter values.

The process determines as to whether to continue (decision 950). If the process should continue, decision 950 branches to the 'Yes' loop, which loops back to continue to collect cache miss resolution data, increment the counters, and update the moving averages. This looping continues until processing should terminate, at which point decision 950 branches to the 'No' branch whereupon processing ends at 960.

Hypervisor dispatch processing commences at 970 that, in one embodiment, is a separate and independent process (thread) from the cache miss resolution data collection and analysis process discussed above. The dispatch process determines as to whether it is time to dispatch a VCPU (decision 975). If it is time to dispatch a VCPU, then decision 975 branches to the 'yes' branch. At step 980, the process utilizes moving averages stored in counters 395 to determine which VCPU to dispatch and which dispatch location.

In one embodiment, the categorization of cache miss behavior allows the hypervisor to predict, based on short term history, the probability of retaining cache states between dispatches. For example, the hypervisor tracks summary information collected over short execution periods for each virtual processor such as 1) cycles between dispatch (retained as ranges in an interval), 2) physical core used, 3) non-on-chip cache accesses (memory or chip cache-to-cache), 4) onchip accesses by shared, redispatch, or other (e.g. lateral castout). In this example, summary information is kept for two cases: 1) the VCPU is dispatched onto the core upon which it previously executed (table A), and 2) when the VCPU is dispatched onto another core on the chip (table B).

In this embodiment, an example used case is invoked each time the hypervisor begins to dispatch an existing virtual processor. During the dispatch procedure, if the selected core to dispatch upon is not the previously used core for the partition, the hypervisor considers waiting to dispatch upon the previously used core over dispatching on the selected core. It also checks if there are no other VCPUs queued to run upon the previously used core, particularly of a higher priority as the hypervisor then does not accurately predict when the previously used core would be free to dispatch upon. If the previously used core does not have queued VCPU's, particularly higher priority VCPU's, then the hypervisor proceeds to a cost calculation. The cost calculation takes the maximum number of cycles that the VCPU currently executing on the previously core can use, based on the dispatcher's quantum of usage. The maximum dispatch delay time for the VCPU in dispatch is computed as the time the currently executing VCPU on the previous core will hit its maximum usage minus the time the VCPU in dispatch was undispatched from that core. Based on the delta time for the potential case of waiting for the previously used core, the hypervisor performs a lookup into tables A&B and applies a weighting factor to the predicted results. Based on a threshold, the hypervisor selects either the previously used core or the currently selected core.

For example, when ready to dispatch a VCPU, if the available cores do not equal a previously used core and the undispached/average dispatch cycles moving average indicates a high chance of reuse on the previously used core, then the hypervisor checks the maximum amount of dispatch time allowed on the previously used core (target) for the VCPU is running.

On the other hand, referring back to decision 975, if it is not time to dispatch a VCPU, then decision 975 branches to the 'no' branch bypassing step 980. The process determines as to whether continue (decision 990). If the process should continue, then decision 990 branches to the 'yes' branch which loops back to wait for more VCPU dispatches. This looping continues until the dispatch process should terminate, at which point decision 990 branches to the 'no' branch exiting the loop. FIG. 9 dispatch processing thereafter ends at 995.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor comprising at least a first core, a second core, and a hypervisor, the method comprising:
   broadcasting, by the first core, a cache line request in response to detecting a cache miss corresponding to a first virtual central processing unit (VCPU) executing on the first core;
   receiving, at the first core, a cache line response from the second core responding to the cache line request, wherein the cache line response comprises tag extension data;
   assigning, by the first core, a cache miss type to the cache miss based on the tag extension data; and
   sending, by the first core, the cache miss type to a hypervisor, wherein the cache miss type is utilized by the hypervisor during a future VCPU dispatch selection.

2. The method of claim 1 wherein the tag extension data comprises a lateral castout flag, the method further comprising:
   assigning a lateral castout type to the cache miss in response to determining that the lateral castout flag is set to true.

3. The method of claim 1 further comprising:
   comparing a first VCPU identifier (ID) corresponding to the first VCPU with a second VCPU ID corresponding to a second VCPU assigned to the cache line data on the second core, wherein the tag extension data comprises the second VCPU ID; and
   in response to determining that the first VCPU ID is different from the second VCPU ID, assigning a VCPU sharing cache miss type to the cache miss.

4. The method of claim 3 further comprising:
   comparing a first dispatch number corresponding to the first VCPU with a second dispatch number corresponding to the second VCPU, wherein the tag extension data comprises the second dispatch number; and
   in response to determining that the first VCPU ID matches the second VCPU ID, and determining that the first dispatch number is different from the second dispatch number, assigning a VCPU reuse cache miss type to the cache miss.

5. The method of claim 3 further comprising:
   comparing a first dispatch number corresponding to the first VCPU with a second dispatch number corresponding to the second VCPU, wherein the tag extension data comprises the second dispatch number; and
   in response to determining that the first VCPU ID matches the second VCPU ID, and determining that the first dispatch number matches the second dispatch number, assigning an uncategorized paradox cache miss type to the cache miss.

6. The method of claim 5 wherein the first dispatch number is retrieved from a hidden register corresponding to the first VCPU.

7. The method of claim 1 further comprising:
   incrementing, by the hypervisor, a counter value corresponding to the first VCPU and the cache miss type;
   computing a moving average based upon the incremented counter value;
   in response to determining that the moving average reaches a threshold, identifying one or more dispatch rules corresponding to the cache miss type; and
   dispatching a selected one of a plurality of VCPUs on a selected one of a plurality of cores based upon the identified one or more dispatch rules, wherein the first VCPU is included in the plurality of VCPUs, and the first core and the second core are include in the plurality of cores.

8. An information handling system comprising:
   one or more processors;
   a memory coupled to at least one of the processors;
   a set of computer program instructions stored in the memory and executed by at least one of the processors in order to perform actions of:
      broadcasting, by the first core, a cache line request in response to detecting a cache miss corresponding to a first virtual central processing unit (VCPU) executing on the first core;
      receiving, at the first core, a cache line response from the second core responding to the cache line request, wherein the cache line response comprises tag extension data;
      assigning, by the first core, a cache miss type to the cache miss based on the tag extension data; and
      sending, by the first core, the cache miss type to a hypervisor, wherein the cache miss type is utilized by the hypervisor during a future VCPU dispatch selection.

9. The information handling system of claim 8 wherein the tag extension data comprises a lateral castout flag, and wherein the processors perform additional actions comprising:
   assigning a lateral castout type to the cache miss in response to determining that the lateral castout flag is set to true.

10. The information handling system of claim 8 wherein the processors perform additional actions comprising:
    comparing a first VCPU identifier (ID) corresponding to the first VCPU with a second VCPU ID corresponding to a second VCPU assigned to the cache line data on the second core, wherein the tag extension data comprises the second VCPU ID; and
    in response to determining that the first VCPU ID is different from the second VCPU ID, assigning a VCPU sharing cache miss type to the cache miss.

11. The information handling system of claim 10 wherein the processors perform additional actions comprising:
    comparing a first dispatch number corresponding to the first VCPU with a second dispatch number corresponding to the second VCPU, wherein the tag extension data comprises the second dispatch number; and
    in response to determining that the first VCPU ID matches the second VCPU ID, and determining that the first dispatch number is different from the second dispatch number, assigning a VCPU reuse cache miss type to the cache miss.

12. The information handling system of claim 10 wherein the processors perform additional actions comprising:
   comparing a first dispatch number corresponding to the first VCPU with a second dispatch number corresponding to the second VCPU, wherein the tag extension data comprises the second dispatch number; and
   in response to determining that the first VCPU ID matches the second VCPU ID, and determining that the first dispatch number matches the second dispatch number, assigning an uncategorized paradox cache miss type to the cache miss.

13. The information handling system of claim 12 wherein the first dispatch number is retrieved from a hidden register corresponding to the first VCPU.

14. The information handling system of claim 8 wherein the processors perform additional actions comprising:
   incrementing, by the hypervisor, a counter value corresponding to the first VCPU and the cache miss type;
   computing a moving average based upon the incremented counter value;
   in response to determining that the moving average reaches a threshold, identifying one or more dispatch rules corresponding to the cache miss type; and
   dispatching a selected one of a plurality of VCPUs on a selected one of a plurality of cores based upon the identified one or more dispatch rules, wherein the first VCPU is included in the plurality of VCPUs, and the first core and the second core are include in the plurality of cores.

15. A computer program product stored in a computer readable storage medium, comprising computer program code that, when executed by an information handling system, causes the information handling system to perform actions comprising:
   broadcasting, by a first core, a cache line request in response to detecting a cache miss corresponding to a first virtual central processing unit (VCPU) executing on the first core;
   receiving, at the first core, a cache line response from a second core responding to the cache line request, wherein the cache line response comprises tag extension data;
   assigning, by the first core, a cache miss type to the cache miss based on the tag extension data; and
   sending, by the first core, the cache miss type to a hypervisor, wherein the cache miss type is utilized by the hypervisor during a future VCPU dispatch selection.

16. The computer program product of claim 15 wherein the tag extension data comprises a lateral castout flag, and wherein the information handling system performs further actions comprising:
   assigning a lateral castout type to the cache miss in response to determining that the lateral castout flag is set to true.

17. The computer program product of claim 15 wherein the information handling system performs further actions comprising:
   comparing a first VCPU identifier (ID) corresponding to the first VCPU with a second VCPU ID corresponding to a second VCPU assigned to the cache line data on the second core, wherein the tag extension data comprises the second VCPU ID; and
   in response to determining that the first VCPU ID is different from the second VCPU ID, assigning a VCPU sharing cache miss type to the cache miss.

18. The computer program product of claim 17 wherein the information handling system performs further actions comprising:
   comparing a first dispatch number corresponding to the first VCPU with a second dispatch number corresponding to the second VCPU, wherein the tag extension data comprises the second dispatch number; and
   in response to determining that the first VCPU ID matches the second VCPU ID, and determining that the first dispatch number is different from the second dispatch number, assigning a VCPU reuse cache miss type to the cache miss.

19. The computer program product of claim 17 wherein the information handling system performs further actions comprising:
   comparing a first dispatch number corresponding to the first VCPU with a second dispatch number corresponding to the second VCPU, wherein the tag extension data comprises the second dispatch number; and
   in response to determining that the first VCPU ID matches the second VCPU ID, and determining that the first dispatch number matches the second dispatch number, assigning an uncategorized paradox cache miss type to the cache miss.

20. The computer program product of claim 15 wherein the information handling system performs further actions comprising:
   incrementing, by the hypervisor, a counter value corresponding to the first VCPU and the cache miss type;
   computing a moving average based upon the incremented counter value;
   in response to determining that the moving average reaches a threshold, identifying one or more dispatch rules corresponding to the cache miss type; and
   dispatching a selected one of a plurality of VCPUs on a selected one of a plurality of cores based upon the identified one or more dispatch rules, wherein the first VCPU and the second VCPU are included in the plurality of VCPUs and the first core and the second core are include in the plurality of cores.

* * * * *